Nov. 21, 1967   R. L. COOPER   3,353,576
SEED POTATO CUTTING MACHINE
Filed Nov. 22, 1965   2 Sheets-Sheet 1

INVENTOR
ROY L. COOPER

BY  *Walter S. Paul*

ATTORNEY

Nov. 21, 1967    R. L. COOPER    3,353,576
SEED POTATO CUTTING MACHINE
Filed Nov. 22, 1965    2 Sheets-Sheet 2

INVENTOR
ROY L. COOPER

BY Walter S. Pavol
ATTORNEY 3,353,576
SEED POTATO CUTTING MACHINE
Roy L. Cooper, Waterman, Ill. 60556
Filed Nov. 22, 1965, Ser. No. 508,929
6 Claims. (Cl. 146—78)

This invention relates to seed potato cutting machines for cutting seed potatoes into small pieces, each containing at least one eye, preparatory to potato planting.

The principal object of this invention is to construct a seed potato cutting machine of the parallel rotating disc type for cutting the potato into suitably thick slices across its substantially longitudinal axis, and having a stationary splitter knife between each pair of cutter discs for splitting each slice held between said discs in half before said split halves are extracted therefrom by guide strips extending between said cutter discs at a suitable tangential angle in the path of said halves back of said splitter knife.

A further object is to provide cooperating potato feeder means for feeding the potatoes to the rotating cutter discs so that the substantially longitudinal axis of each potato extends normally to said cutter discs and having portions extending between said discs, which are provided with peripheries that are tapered to a sharp cutting edge, and overlapping their peripheries beyond the base of their cutting tapers, so as to push the cut potato slices into fully compressed holding engagement with the discs on the opposite sides of each slice.

A further object is to include guide means at one side of said feeder means for spacing one end of each potato with respect to the corresponding side disc to cut a suitably small size clip from said one end of the potato for planting without requiring further splitting of said clip.

Other and more specific objects will become apparent in the following detailed description of some preferred forms of the present invention, as illustrated in the accompanying drawings, wherein.

The cutting machine illustrated herein has a support frame 10, on which the several operating parts are mounted in a novel arrangement, whereby a slicing and halving of the slices is done in substantially one operation before the potato pieces are ejected from the cutter in an effective and more economical and smaller machine than has heretofore been possible.

Figure 1:
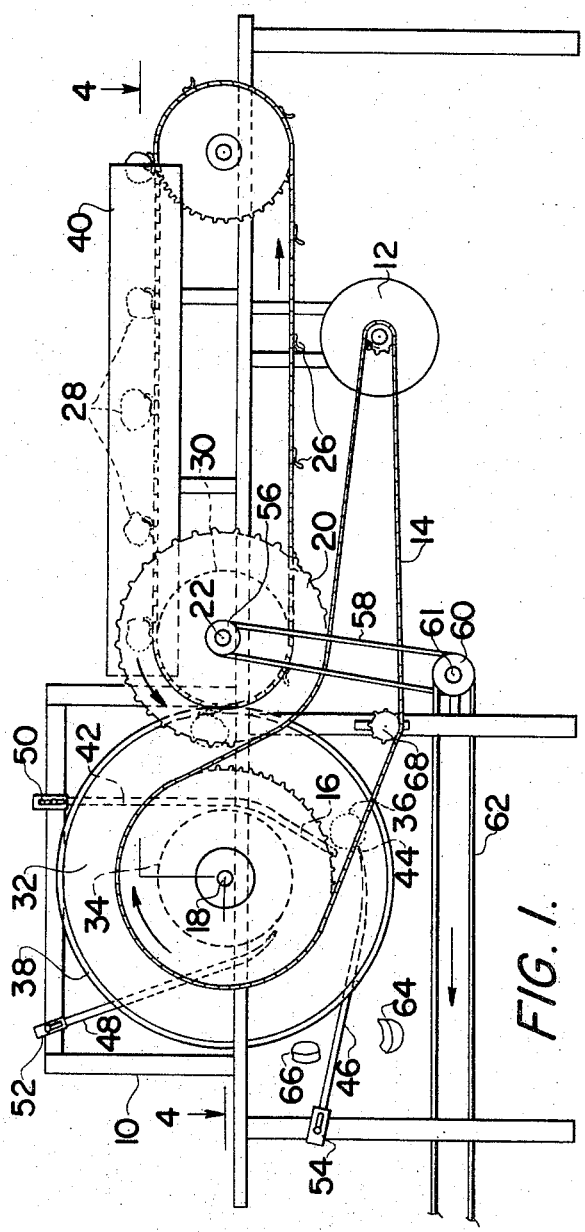
FIG. 1 is a side elevational view of one form of the invention.
Figure 4:
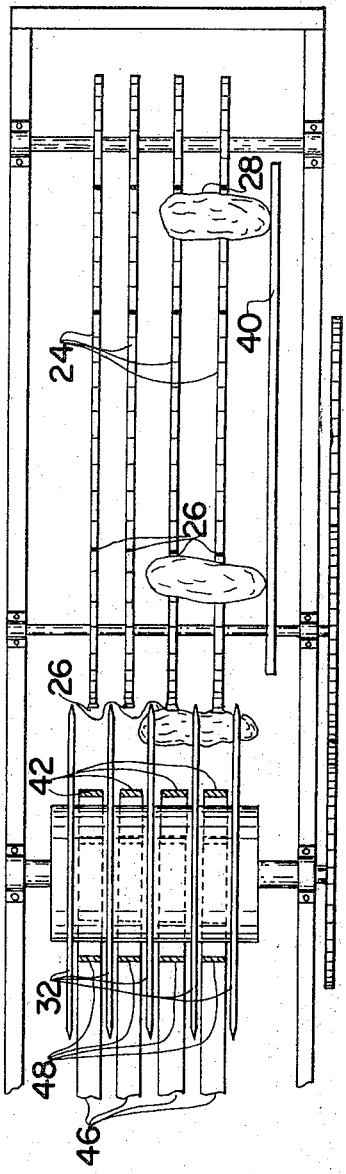
FIG. 4 is a sectional plan view taken on line 4—4 in FIG. 1.
Figure 2:
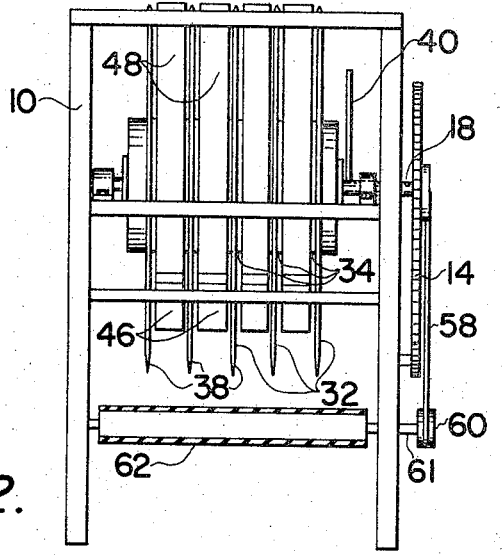
FIG. 2 is an end elevational view thereof, taken from the left of FIG. 1.
Figure 3:
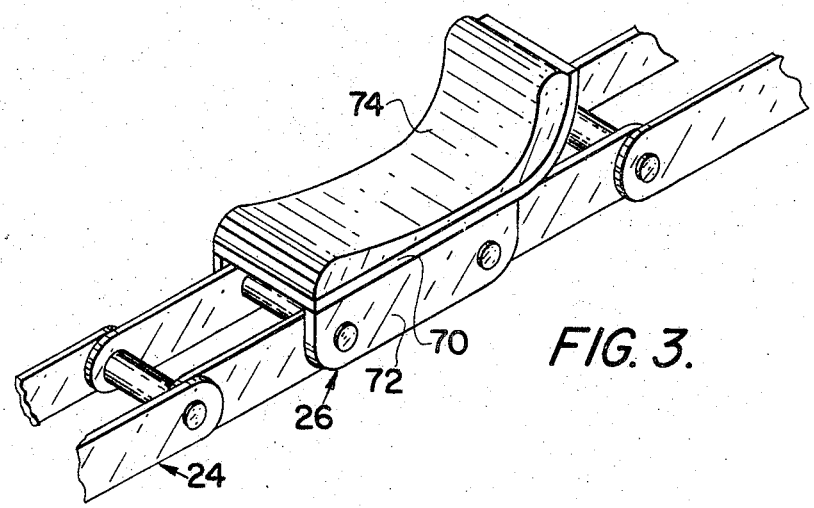
FIG. 3 is an enlarged detail view of one of the cradle links in a conveyor chain that may be used for feeding potatoes to the cutters.

A reduction motor 12 mounted on the support frame 10 is operatively connected by chain 14 to drive the sprocket 16 on the cutter shaft 18 in a clockwise direction as seen in FIG. 1, and to drive the sprocket 20 in the feeder drive shaft 22 in a counter clockwise direction. The drive shaft 20 has a series of sprockets 30 for driving the conveyor chains 24 with cradle links 26 at suitable intervals for receiving potatoes 28 at one end of the support frame and delivering them to the cutters at the other end thereof.

The cutters comprise a plurality of thin circular disc cutter blades 32 fixed on shaft 18 with spacers 34 between discs to provide suitably thick potato slices 36. These discs have sharp peripheral knife edges 38, but otherwise have smooth parallel sides.

The potatoes are placed crosswise on the cradle links lined up on each of the conveyor chains 24 across the conveyor, with the left end of the potato guided against the guide plate 40 so that a reasonably thick end slice or clip will always be cut at least at this end of every potato fed to the cutters regardless of its size. This saves a lot of unnecessary sliver waste which is sustained in using previous cutters without any guide plate, by providing a sufficiently thick end clip at least at one end of each potato instead of possibly getting useless slivers at both ends of many potatoes.

The conveyor chains 24 and cradle links 26 thereon are narrow enough to clear the cutter discs as they push their respective potato slices between the cutter discs past the circumferential base lines of their respective peripheral knife edges, so that the slices are compressed a full thickness of one cutter disc into a tight gripping position between the discs inside said circumferential base lines of the knife edges. As the slice is pushed into this position it is moved off its cradle link and out of the way of the back of the cradle because, although the discs and the cradle link are turned at the same angular speed about their respective drive shafts, the potato slice moves at a greater radius from its drive shaft than the radius of the conveyor chain sprocket 30, and thus travels at a greater linear speed than the cradle link. Furthermore, the tangent arcs along which these elements travel, diverge after the slice is pushed fully past the circumferential base lines of the knife edges.

Between each pair of adjacent discs 32 a stationary guide strip 42 guides the potato slice radially outwardly if necessary, so as to strike the knife edge 44 at the end of the cutter bar 46 about the middle of the slice, whereby the slice will be cut in half. The outer half 64 of the slice is extracted from between the discs by the shank of cutter bar 46, which guides it radially outwardly of the discs, and the inner half 66 is carried further clockwise around the disc shaft until it meets and is similarly extracted by, the guide strip 48. If the slice or clip at the right end of the potato does not happen to be sufficiently thick to be held very firmly between the discs, it may stop when it is guided against the knife edge 44 by the guide strip 42, until the next slice which is firmly held between the same discs comes along and pushes it through ahead of itself as it is carried past the knife edge, and all four halves are ejected by the cutter bar 46 and the guide strip 48. The guide strips 42 and 48 and the cutter bar 46 are adjustably fixed to the support frame at 50, 52 and 54 respectively, so that they may be suitably adjusted for the average size of potatoes being used.

Shaft 18 has a pulley 56 on the outside of sprocket 16 connected by belt 58 with a pulley 60 on the corresponding end of a roller drive shaft 61 for driving a conveyor belt 62, which receives the cut potatoes as they are ejected from the cutters and fall on the belt 62. Belt 62 delivers the cut potatoes to suitable containers (not shown) for immediate planting, or for dusting and later planting.

68 is an idler sprocket. The cradle link 26 has a flat strip 70 fixed, as by welding, to the upper edges of its sides 72. The rear end of strip 70 is curved upwardly, and a foam rubber or other padding 74 is used on this strip. These cradle links are lined up crosswise of the conveyor on all the conveyor chains 24 at intervals along the conveyor chain convenient to load the potatoes on the cradles as they pass by during operations of the machine.

The novel arrangement of cutters for slicing and halving the slices without bruising them makes a more compact and efficient machine than any previously made.

Many obvious modifications in the details and arrangement of parts may be made without departing from the spirit and scope of the present invention as defined in the appended claims.

What is claimed is:

1. A seed potato cutting machine comprising
a support frame,
a plurality of thin circular disc cutters mounted in suitably spaced parallel relation on a common drive shaft extending across one end of said support frame,
potato feeding conveyor means mounted in said frame for conveying potatoes placed thereon near the other end of said support frame, to said disc cutters,
said conveyor means being adapted to push each potato into said plurality of disc cutters as the potato is cut thereby into slices so that each slice between a pair of said disc cutters is firmly held between them within the periphery of their full thickness at the base of their circumferential knife edges,
a stationary cutter bar extending into the space between each pair of said disc cutters and having a knife edge at its inner end extending across said space at a radius corresponding substantially to the center of said slices held between said disc cutters for cutting said slices in half, as each slice is moved past said inner end,
guide bars mounted on said frame and extending tangentially into said spaces for guiding the inner of said two halves out of said spaces behind said cutter bar knife edges, said cutter bar having a shank portion serving as a guide bar for extracting the outer of said two halves of its potato slice, and
motor means mounted on said frame connected to drive said conveyor means and said cutter drive shaft at suitable relative speeds.

2. A cutting machine as defined in claim 1, and
a guide plate at one side of said conveyor means adapted to position each potato across said conveyor means so that the disc cutter at the corresponding end of the disc drive shaft will cut off a substantially thick end slice at least at one end of every potato.

3. A cutting machine as defined in claim 2,
said potato feeding conveyor means including a plurality of sprockets spacedly mounted on a common drive shaft which is mounted in said support frame parallel to and substantially at the same level as the drive shaft of said circular disc cutters,
said sprockets having a substantially smaller radius than said disc cutters, and said drive shafts being spaced so that the peripheries of said sprockets and disc cutters overlap to bring the periphery of said sprockets to substantial tangency with the circumferential bases of the circular knife edges, said sprockets being spaced on their drive shaft to enter the spaces between each adjacent pair of said disc cutters, and
an endless conveyor chain extending horizontally from the other end of the frame over each of said sprockets through said cutter spaces, and having cradle links at intervals along each chain, said cradle links being lined up crosswise of said conveyor means to accommodate longer potatoes on each cradle position.

4. A cutting machine as defined in claim 3,
said cradle links each comprising a pair of conventional link sides and a strip fixed to the outer edges of said sides and having an outwardly curved extension at its rear end, and a pad of soft material lining the outside of said strip forming a hollowed-out groove transversely of said strip for holding its portion of a potato placed therein and bruislessly pushing it as it is sliced into the corresponding space between the adjacent pair of disc cutters far enough to be firmly held therebetween and moved past said stationary knife edge at the inner end of the corresponding cutter bar so as to cut the slice in half.

5. A cutting machine as defined in claim 4, and
a conveyor belt having a roller mounted on a drive shaft transversely in said support frame under said multi-sprocket drive shaft and extending substantially horizontally from said roller outwardly from said one end of the support frame and adapted for receiving the cut potatoes as they are dropped from said disc cutters for delivery thereby to a collecting station.

6. A cutting machine as defined in claim 5, and a pulley and belt drive connection between the ends of said multi-sprocket shaft and said roller drive shaft, on the outside of said drive sprockets for driving said conveyor belt.

References Cited

UNITED STATES PATENTS

| | | | |
|---|---|---|---|
| 1,710,421 | 4/1929 | Jorgenson | 146—57 X |
| 2,503,069 | 4/1950 | Reichart | 146—78 |

WILLIAM W. DYER, Jr., *Primary Examiner.*

JAMES M. MEISTER, *Examiner.*